(12) United States Patent
Kerwin

(10) Patent No.: US 12,306,614 B2
(45) Date of Patent: May 20, 2025

(54) SMART TOOL WITH INTEGRATED NEURAL NETWORK IMAGE ANALYSIS

(71) Applicant: K2Ai, LLC, Oak Park, MI (US)

(72) Inventor: Kevin Richard Kerwin, Birmingham, MI (US)

(73) Assignee: K2Ai, LLC, Oak Park, MI (US)

(*) Notice: Subject to any disclaimer, the term of this patent is extended or adjusted under 35 U.S.C. 154(b) by 371 days.

(21) Appl. No.: 17/411,595

(22) Filed: Aug. 25, 2021

(65) Prior Publication Data

US 2022/0121177 A1    Apr. 21, 2022

Related U.S. Application Data

(60) Provisional application No. 63/093,613, filed on Oct. 19, 2020.

(51) Int. Cl.
| | | |
|---|---|---|
| *G05B 19/418* | (2006.01) | |
| *G05B 19/04* | (2006.01) | |
| *G06N 3/04* | (2023.01) | |
| *G06T 7/70* | (2017.01) | |

(52) U.S. Cl.
CPC ..... *G05B 19/4183* (2013.01); *G05B 19/0405* (2013.01); *G05B 19/4185* (2013.01); *G06N 3/04* (2013.01); *G06T 7/70* (2017.01)

(58) Field of Classification Search
CPC ............ G05B 19/4183; G05B 19/0405; G05B 19/4185; G05B 19/41805; G05B 2219/45127; G06N 3/04; G06T 7/70; Y02P 90/02; B23Q 17/249; B25F 5/00
See application file for complete search history.

(56) References Cited

U.S. PATENT DOCUMENTS

| | | | |
|---|---|---|---|
| 2018/0017972 A1* | 1/2018 | Chefalas | G05D 1/0088 |
| 2018/0130377 A1* | 5/2018 | Meess | B23K 9/0956 |
| 2019/0246858 A1 | 8/2019 | Karasikov et al. | |

(Continued)

FOREIGN PATENT DOCUMENTS

| | | |
|---|---|---|
| EP | 2308648 A2 | 4/2011 |
| EP | 3372338 A1 | 9/2018 |
| WO | 2018188817 A1 | 10/2018 |

OTHER PUBLICATIONS

International Search Report and Written Opinion for International Patent Application No. PCT/US2021/047507 completed on Nov. 8, 2021.

*Primary Examiner* — Thomas C Lee
*Assistant Examiner* — Tyler Dean Hedrick
(74) *Attorney, Agent, or Firm* — Carlson, Gaskey & Olds, P.C.

(57) ABSTRACT

A smart tool includes a body having a working output. A first controller is disposed within the body and connected to a plurality of sensors. The plurality of sensors includes at least one camera having a field of view at least partially capturing the working output. A neural network is trained to analyze an image feed from the at least one camera and trained perform at least one of classifying at least one of a working tool and an extension connected to the working output, classifying a component and/or a portion of a component interfaced with the working output, and determining a positioning of the smart tool. The neural network is stored in one of the first controller and a processing unit remote from the smart tool.

18 Claims, 2 Drawing Sheets

(56) References Cited

U.S. PATENT DOCUMENTS

| | | | |
|---|---|---|---|
| 2021/0101263 A1* | 4/2021 | Hwang | G06V 10/32 |
| 2021/0187676 A1* | 6/2021 | Schroeder | B64F 5/10 |
| 2022/0299946 A1* | 9/2022 | Abbott | B25F 5/00 |
| 2022/0324102 A1* | 10/2022 | Barral | G16H 50/70 |
| 2022/0395334 A1* | 12/2022 | Meglan | A61B 34/10 |
| 2022/0410360 A1* | 12/2022 | Erbele | B25B 23/147 |

* cited by examiner

SMART TOOL WITH INTEGRATED NEURAL NETWORK IMAGE ANALYSIS

CROSS-REFERENCE TO RELATED APPLICATION

This application claims priority to U.S. Patent Application No. 63/093,613 filed on Oct. 19, 2020.

TECHNICAL FIELD

The present disclosure relates generally to smart tool systems, and more specifically to a smart tool including a neural network configured to identify a selected tool, attachment or extension and/or a position of the selected tool, attachment or extension relative to a home position or a portion of a component being worked.

BACKGROUND

Assembly systems and processes often include multiple ordered steps, with each step requiring the usage of one or more tools to install, tighten, or otherwise manipulate a portion of the assembly. In some examples, it is important that only the correct tool or the correct amount of force be applied in a given manipulation step. In other examples, the steps must be performed in a certain order with a tool change occurring in between certain steps.

Existing systems attempt to control the usage of the correct tool or the correct attachment for any given step by utilizing sorted tools and/or attachments that are presented to the user in a predetermined order or in predetermined locations. Such systems can be inefficient or lead to inaccurate assembly when a tool or attachment is inadvertently placed in the wrong bin or the bins are placed in an incorrect order, or when other human errors occur resulting in the wrong tool, attachment or extension being applied in a given step.

SUMMARY OF THE INVENTION

In one exemplary embodiment a smart tool includes a body having a working output, a first controller disposed within the body and connected to a plurality of sensors, the plurality of sensors including at least one camera having a field of view at least partially capturing the working output, and a neural network trained to analyze an image feed from the at least one camera and trained perform at least one of classifying at least one of a working tool and an extension connected to the working output, classifying a component and/or a portion of a component interfaced with the working output, and determining a positioning of the smart tool, the neural network being stored in one of the first controller and a processing unit remote from the smart tool.

In another example of the above described smart tool the first controller includes an image processing module and the first controller is communicatively coupled to the processing unit.

In another example of any of the above described smart tools the first controller is in wireless communication with the processing unit.

In another example of any of the above described smart tools the neural network is contained within the first controller.

In another example of any of the above described smart tools the at least one camera includes a first camera fixedly connected to the body.

In another example of any of the above described smart tools the at least one camera includes a second camera communicatively connected to the first controller and disposed remote from the body.

In another example of any of the above described smart tools the second camera is a wearable camera.

In another example of any of the above described smart tools the at least one camera includes a remote camera remote from the body and communicatively coupled to the controller.

In another example of any of the above described smart tools the at least one of the working tool and the extension to the working output includes a visual identifier visible in the field of view, and wherein the neural network is trained to classify the at least one of the working tool and the extension at least partially based on the visual identifier.

In another example of any of the above described smart tools the neural network is further configured to analyze the image feed and determine location of the smart tool relative to a home position.

In another example of any of the above described smart tools, the neural network is further configured to determine at least one of a physical orientation or angle of approach of the working tool and the extension connected to the working output.

An exemplary method for operating a tool includes generating a least a first video feed including at least a portion of a tool, the portion including a working output of the tool, identifying, using a neural network based image analysis of the at least the first video feed, at least one of an attachment on the working output of the tool, an extension on the working output of the tool, and an element being worked by the working output of the tool, and responding to the identified at least one of the attachment on the working output of the tool, the extension on the working output of the tool, and the element worked by the working output of the tool by altering an operation of the tool.

In another example of the above described method for operating a tool altering the operation of the tool includes at least one of altering a force applied by the working output such that the force corresponds to an identified attachment and prompting a user to alter operations of the tool.

In another example of any of the above described methods for operating a tool generating the at least the first video comprises generating a plurality of video feeds via cameras attached to a smart tool, and wherein identifying at least one of the attachment the extension and the element comprises analyzing each of the video feeds in the plurality of video feeds.

In another example of any of the above described methods for operating a tool generating the at least the first video comprises generating a second video feed from a wearable camera and wherein the wearable camera wirelessly communicates the second video feed to a smart tool controller.

In another example of any of the above described methods for operating a tool the neural network image analysis is performed by a controller local to the tool.

In another example of any of the above described methods for operating a tool the neural network image analysis is performed by a processing unit remote from the tool and in communication with a controller disposed in the tool.

Another example of any of the above described methods for operating a tool further includes preprocessing the video feed prior to analyzing the video feed using the neural network based analysis.

In another example of any of the above described methods for operating a tool responding to the identified at least one of the attachment on the working output of the tool, the extension on the working output of the tool, and the element worked by the working output of the tool comprises identifying that the tool is out of a home position.

In another example of any of the above described methods for operating a tool responding to the identified at least one of the attachment on the working output of the tool, the extension on the working output of the tool, and the element worked by the working output of the tool comprises identifying a lack of attachments and/or tools connected to the working output and identifying that a set of tools configured to be connected to the working output and the body are disposed in a home position and outputting an all tools home notification.

In another example of any of the above described method responding to the identified at least one of the attachment on the working output of the tool, the extension on the working output of the tool, and the element worked by the working output of the tool includes identifying at least one of the physical orientation or angle of approach of the tool and the extension connected to the working output of the tool, comparing the at least one of the physical orientation or angle of approach of the tool and the extension connected to the working output of the tool to an expected at least one of the physical orientation or angle of approach of the tool and the extension connected to the working output of the tool and outputting a notification to a user in response to the at least one of the physical orientation or angle of approach of the tool and the extension connected to the working output of the tool varying from the expected at least one of the physical orientation or angle of approach of the tool and the extension connected to the working output of the tool.

DETAILED DESCRIPTION

Figure 1:
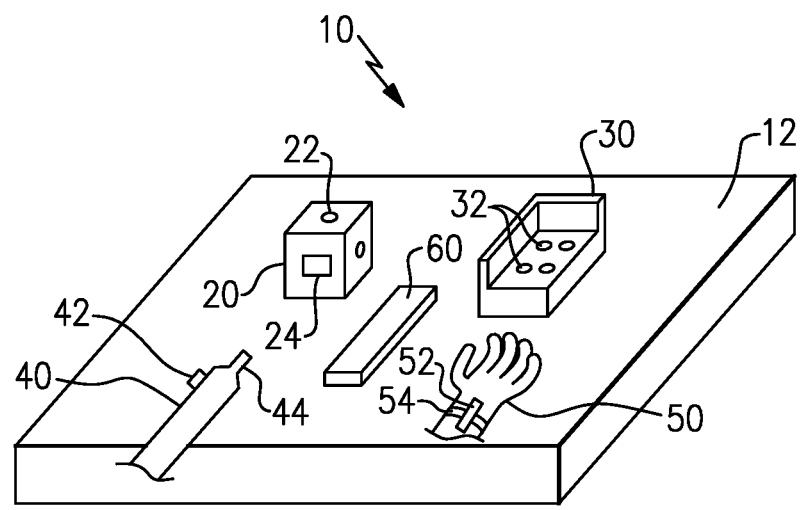
FIG. 1 illustrates a high level schematic workstation for assembling a component.

FIG. 1 schematically illustrates a workstation 10 with an assembly 20 placed within a work area 12 on the workstation 10. The assembly 20 includes multiple fasteners 22 and connection points 24, each of which need to be interacted with or connected in a specific order using a specific tool or tool attachment. While illustrated herein as a simple mechanical assembly, it is appreciated that substantially more complex machines or intricate assemblies can benefit from the smart tool system disclosed herein. A set of bins 30 is positioned near the assembly 20, and includes multiple fasteners and tool attachments 32 disposed in sorted bins. An assembly worker uses a tool 40 (described in greater detail with regards to FIG. 2) to interact with the assembly 20. The tool 40 includes a camera 42 and a working output 44. The working output 44 is configured to work either an extension or a tool, which in turn works an attachment or fastener on the assembly 20. In one example the working output can be a rotational output configured to rotate screws, bolts, or similar fasteners. In other examples the working output can be a linear actuation, welding gun, riveting gun, a cylinder and the like.

The camera 42 is oriented such that the working output 44 and any portion(s) of the assembly 20 being worked on via the working output 44 are within the field of view of the camera 42. The video feed generated by the camera 42 is provided to a controller 121 (illustrated in FIG. 2) and/or a processing unit 140 (illustrated in FIG. 2). Also on the workstation 10 is a tool home 60. The tool home 60 can be a storage case, a designated location for placing the tool 40 while not in use, or any other home/storage position of the tool. In alternative examples the home 60 can be located remote from the workstation 60, such as on a shelving unit, in a storage bin, or similar, and the system can function in the same manner.

In addition to using the tool 40, portions of some assembly processes utilize hand manipulation or selection of tool attachments via the user's hand 50. In the illustrated example, a wearable camera 52 is connected to the controller 121 or processing unit 140, and provides an image feed, in the form of video footage, to the controller in the same manner as the camera 42 fixed to the tool 40. In some examples, the wearable camera 52 is used instead of the attached camera 42. In alternative examples, the wearable camera 52 can be the camera 42 detached from the tool 40 and connected to a wearable strap 54. In alternative examples, the wearable camera 52 can be worn at other positions, including on the forehead, on a finger, or any other relevant positioning and can supplement the video feed from the attached camera 42.

In yet further examples, the smart tool neural network analysis is incorporated into a remote analysis computer (referred to as a processing unit or a remote processing unit) and utilizes the wearable camera 52 in conjunction with one or more hand tools in a similar fashion to a fully integrated smart tool.

Figure 2:
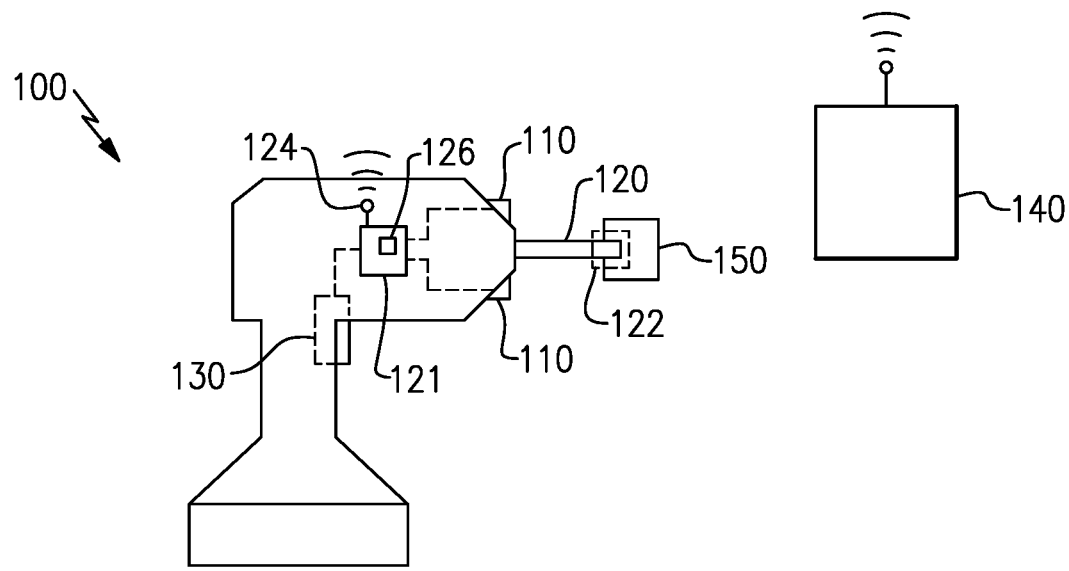
FIG. 2 schematically illustrates a smart tool according to one example.

With continued reference to FIG. 1, FIG. 2 illustrates an exemplary smart tool 100. The smart tool 100 includes multiple cameras 110 each of which has a field of view including at least a portion of a working output 120 of the tool 100. The working output 120 includes a connector 122 configured to connect the working output 120 to either a tool 150 or an extension, and configured to translate work from the working output 120 to the tool 150 or extension. Each of the cameras 110 is connected to a controller 121. The controller 121, in the illustrated example, is also connected to an activation button 130 which activates one or more operations of the smart tool 100. In alternative examples, more complicated tools including multi-speed operations, multiple distinct operations, or other features can have the operation controls affected or controlled by the controller 121 based on the image analysis of the smart tool system 100. In the illustrated example, the controller 121 also includes a wireless communicator 124.

The wireless communication system 124 can utilize any short range wireless communication protocol to communicate between the controller 121 and a remote camera 52 (see FIG. 1), between controller 121 and a remotely located processing unit 140 storing the neural network analysis system, or both. In alternative examples the connection can be a wired connection directly connecting the remote camera 52 to the processing unit 140 or controller 121, and determine one or more features of the image.

In some examples the controller 121 includes an image processing module 126. The image processing module 126 is configured to preprocess the image feed generated by the cameras 110. The pre-processing can utilize any image processing procedure and improves the ability to identify images within the processed video feed using a neural network analysis. By way of example, the image pre-processing can include any of sharpening and/or blurring images, converting to gray scale and/or other color spectrum conversions, masking out regions of the image, digital zoom or image size changes, and/or any other pre-processing or combination of pre-processing procedures. In example systems incorporating a detachable camera 110, the detachable camera can include the pre-processing locally, or the pre-processing can be incorporated into the controller 126.

With reference to both FIG. 1 and FIG. 2, either the controller 122 or the remotely located processing unit 140 includes a neural network. The neural network can be a convolutional neural network, or any similar neural network, and is trained to analyze images received from the cameras 42, 52, 110, and determine one or more features in the image.

In one example the features determined include the specific tool or attachment connected to the working output. In another example, the features determined include identifying a specific position on the assembly 20 (e.g. a specific bolt number) that is being worked, identifying an orientation of the tool or working output, and/or identifying a type of element (e.g. distinguishing between bolt connection and a screw connection) being worked. In yet further examples, the features determined include a combination of the above.

Figure 3:
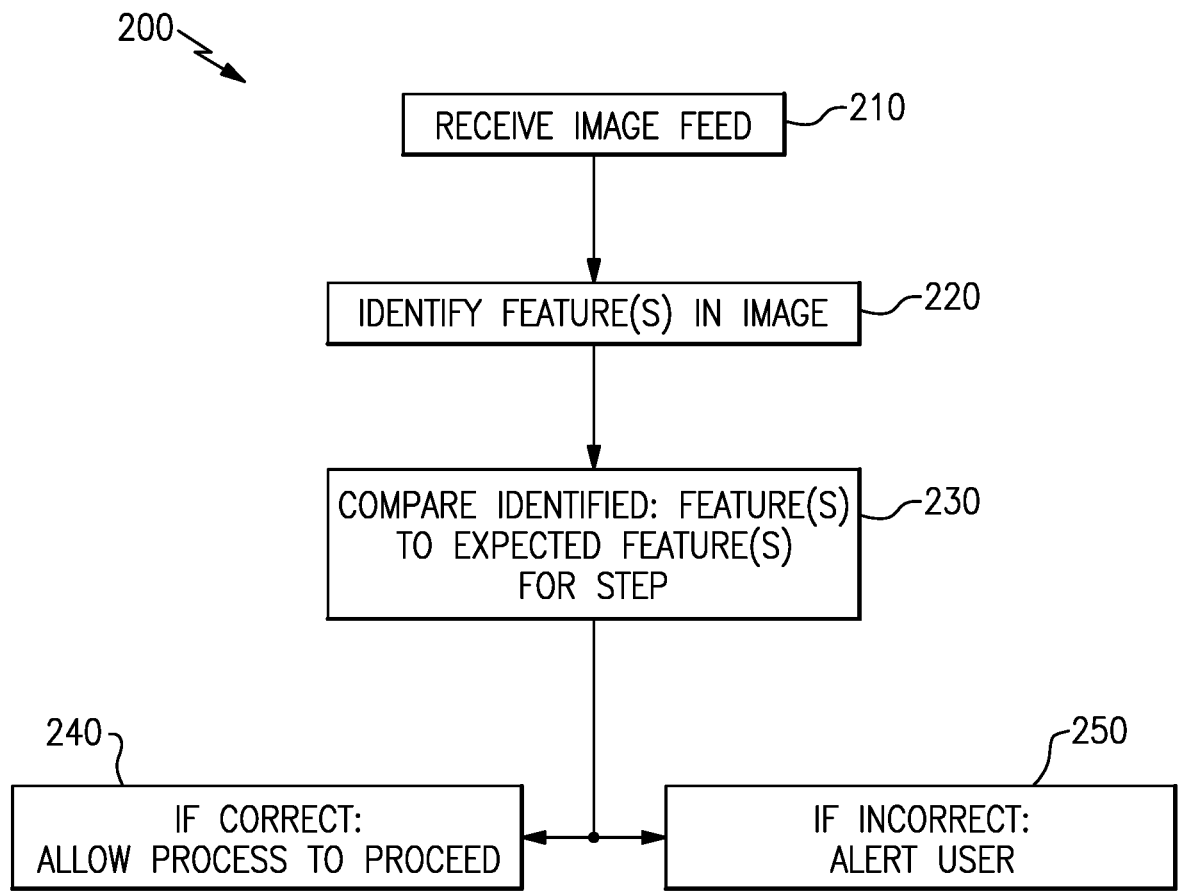
FIG. 3 illustrates a process for using the smart tool of FIG. 2 to enhance an assembly process.

FIG. 3 schematically illustrates a first process 200 for using the neural network analysis of the smart tool 100 of FIG. 2 and described generally above to ensure that a correct tool is attached, or the correct work is applied for a current operation. Initially an image feed generated from one or more cameras is provided to the controller 121 in a "Receive Image Feed" step 210. In examples where the neural network analysis is performed on the remote processing unit 140, the controller 121 can perform a pre-processing function to condition the image feed for analysis or act as a passthrough to provide the image feed to the neural network on the processing unit 140 depending on the configuration of the overall system. In other examples, the received image feed is analyzed using a neural network disposed on the controller 121 itself. In further examples, the received image feed can include multiple image feeds from multiple cameras disposed about the smart tool and/or wearable cameras connected to the smart tool.

The neural network uses video and image analysis to determine the presence of an attachment, tool, or extension in the image in an "Identify Feature in Image" step 220. Once the neural network analysis determines that a feature is present in the image feed, a processor in either the controller 121 or the image analysis system 140 classifies the identified feature to determine what type of feature is present and/or what portion after the assembly is being worked on. In some examples, the neural network analysis further determines a physical orientation or angle of approach of the attachment tool or extension during the identify feature in image step. In one example, the neural network analysis identifies that a socket (the feature) has been selected by the user's hand, and the neural network analyzes the socket to determine what size and/or shape socket has been selected. In another example, the neural network analysis identifies that an extension (the feature) has been attached to the working output 120 of the tool 100, and the identify feature in image step 220 determines the type of extension that is attached. In another example, the neural network identifies that the tool is being used on a specific position (the feature(s)) of the assembly, or on a specific type of attachment for the assembly. In another example, the neural network identifies that the tool is being used or held in a given orientation at a given angle.

In some examples the neural network can be configured to determine the type of feature, tool angle, and/or tool orientation based purely on training the neural network to recognize image characteristics inherent to the feature. In other examples, the feature(s) can include markings incorporated on the feature with the markings identifying one or more parameters (e.g. size, metric/imperial, etc.) of the feature. In this example the features or markings do not impact the mechanical functioning of the tool, attachment or extension and assist the neural network in identifying the specific features of the tool, attachment or extension once it has been identified by the neural network analysis. In alternative examples, the markings can include physical intrusions and/or protrusions (such as engravings or reliefs) that assist the neural network in identifying the type of features in the image.

In addition to performing the neural network analysis of the image feed, the controller 121 and/or analysis system 140 monitors a current step of a process being performed, including a type of tool, attachment or extension that is required to be used for the current step of the process and/or a type of tool or attachment required for working on the identified feature of the assembly. Once the actual tool, attachment, or extension of the feature in the image feed(s) is identified by the neural network, the controller 121 and/or the processor 140 compares the determined tool, attachment or extension to the expected tool, attachment or extension in a "Compare Identified Feature(s) to Expected Feature(s) for Step" step 230. In alternative examples, the comparison step 230 can correlate the type of tool, attachment or extension with a type of connection or fastener within the field of view of one or more of the cameras 42, 52, 110 by identifying the type of connection or fastener using the image analysis.

When the identified tool, attachment, or extension matches the expected tool, attachment or extension the process determines that the correct tool, attachment or extension for the current step is selected, or when the identified tool, attachment, or extension corresponds to the identified connection or fastener, the process is allowed to continue normal operations in an "Allow Process to Proceed" step 240. In some examples, allowing the process to proceed includes setting a force output, such as a magnitude of torque, corresponding to the selected step and tool, attachment or extension.

When the identified feature does not match the expected feature, or does not correspond to the identified connection or fastener, the system identifies that the incorrect tool, attachment or extension has been selected or the smart tool is interfaced with the incorrect feature of the assembly and alerts the user of the incorrect selection in an "Alert User" step 250. In some examples, when it is determined that the incorrect tool, attachment, or extension has been selected the controller 121 can prevent operation of the tool 100 until the correct tool, attachment or extension is selected.

In one further example, each step can include a defined comfortable orientation and/or angle of approach of the tool or working attachment. When the determined orientation or angle of attack does not match the defined comfortable orientation and/or angle of approach of the tool or working attachment, the alert user step can either prevent operation of the tool or alert the user of a more comfortable orientation or angle of approach.

In yet further examples, the system can adjust the type or amount of working output dependent on the identified feature. By way of example, when the identified feature is a specific type of fastener, is working a specific part of the assembly, or the tool is approaching the identified feature from a specific angle, the smart tool is configured to respond by applying a preset magnitude of torque corresponding to the identified feature or combination of features. Similarly, when the identified feature includes a specific fastener 22 or connection point 24 on the assembly that requires a particularly defined output from the working output 120, the processing unit 140 determines that the identified feature is the portion being worked and automatically adjusts the working output 120 to provide the corresponding magnitude and type of working output. To facilitate the correct preset working outputs for each specific connection point or fastener, the neural network is trained to recognize each connection point or fastener from multiple camera angles and multiple operations, and the particular outputs of each tool type for a given connection point or fastener are correlated with the connection point or fastener during the training.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A smart tool system comprising:
a tool having a body including a working output;
a first controller disposed within the body and connected to a plurality of sensors, the plurality of sensors including at least one camera fixedly connected to the body and having a field of view that at least partially captures the working output and at least partially captures an assembly to be worked by the working output; and
a neural network trained to analyze an image feed from the at least one camera and determine a tool output component currently affixed to the tool and trained to identify features of the assembly from multiple camera angles;
processing circuitry configured to:
determine a current step to be performed using the tool;
utilize the neural network to determine, based on one or more images from the at least one camera, a feature of the assembly corresponding to the current step based on characteristics inherent to the feature and not a marking incorporated on the assembly;
utilize the neural network to determine, based on one or more images from the at least one camera, a current tool output component, the current tool output component comprising at least one of an attachment or extension for a working output of the tool;
perform a first comparison of the feature of the assembly to an expected feature of the assembly for the step;
perform a second comparison of the current tool output component to a required tool output component that is required for the tool to perform the current step; and
based on the first comparison indicating that the feature of the assembly is different from the expected feature, prevent operation of the tool; and
based on the second comparison indicating that the current tool output component is different from the required tool output component, prevent operation of the tool.

2. The smart tool system of claim 1, wherein:
the first controller includes an image processing module;
the first controller is communicatively coupled to the processing unit; and
the first controller is in wireless communication with the processing unit.

3. The smart tool system of claim 1, wherein:
the first controller includes an image processing module;
the first controller is communicatively coupled to the processing unit; and
the neural network is contained within the first controller.

4. The smart tool system of claim 1, wherein the at least one of the working tool and the extension to the working output includes a visual identifier visible in the field of view, and wherein the neural network is trained to classify the at least one of the working tool and the extension at least partially based on the visual identifier.

5. The smart tool system of claim 1, wherein the neural network is further configured to analyze the image feed and determine a location of the smart tool relative to a home position.

6. The smart tool system of claim 1, wherein the neural network is configured to determine at least one of a physical orientation or angle of approach of the working tool and the extension connected to the working output.

7. The smart tool system of claim 6, wherein the processing circuitry is configured to identify a lack of a tool output component at an output of the tool, identify that a set of tools configured to be connected to the working output and the body are disposed in a home position, and output an all tools home notification.

8. The smart tool system of claim 1, wherein the processing circuitry is configured to:
based on the current tool output component matching the required tool output component, automatically adjust the tool to utilize a force output for the tool output component that corresponds to the current step.

9. The smart tool system of claim 1, wherein the required tool output comprises a required socket shape, required socket size, or both.

10. A method for operating a tool comprising:
determining a current step to be performed using a tool in relation to a connection point or fastener of an assembly;
determining a tool output component that is required for the tool to perform the current step, the tool output component comprising at least one of an attachment or extension for a working output of the tool;
generating, using at least one camera fixedly connected to a body of the tool, at least one video feed that depicts a tool output component currently affixed to the tool, wherein the at least one camera has a field of view that at least partially captures the working output and at least partially captures the assembly, which is to be worked by the working output;
utilize a neural network to determine, based on one or more images from the at least one video feed of the at least one camera, a feature of the assembly corresponding to the current step based on characteristics inherent to the feature and not a marking incorporated on the assembly, wherein the neural network is trained to identify features of the assembly from multiple camera angles;
utilizing the neural network to determine, based on one or more images from the at least one video feed of the at least one camera, a current tool output component, the current tool output component comprising at least one of an attachment or extension for a working output of the tool;

performing a first comparison of the feature of the assembly to an expected feature of the assembly for the step;
performing a second comparison of the current tool output component to a required tool output component that is required for the tool to perform the current step; and
based on the first comparison indicating that the feature of the assembly is different from the expected feature, preventing operation of the tool; and
based on the second comparison indicating that the current tool output component is different from the required tool output component, preventing operation of the tool.

11. The method of claim 10, comprising:
based on the current tool output component matching the required tool output component, automatically adjusting the tool to utilize a force output for the tool output component that corresponds to the current step.

12. The method of claim 10, wherein generating the at least one video comprises generating a plurality of video feeds via cameras attached to a smart tool, and wherein identifying at least one of the attachment the extension and the element comprises analyzing each of the video feeds in the plurality of video feeds.

13. The method of claim 10, wherein the neural network image analysis is performed by one of a controller local to the tool and a processing unit remote from the tool and in communication with a controller disposed in the tool.

14. The method of claim 10, further comprising preprocessing the at least one video feed prior to analyzing the at least one video feed using the neural network based analysis.

15. The method of claim 10, comprising identifying that the tool is out of a home position.

16. The method of claim 10, comprising identifying a lack of a tool output component at an output of the tool, identifying that a set of tools configured to be connected to the working output and the body are disposed in a home position, and outputting an all tools home notification.

17. The method of claim 10, comprising:
identifying at least one of the physical orientation or angle of approach of the tool and the extension connected to the working output of the tool;
comparing the at least one of the physical orientation or angle of approach of the tool and the extension connected to the working output of the tool to an expected at least one of the physical orientation or angle of approach of the tool and the extension connected to the working output of the tool; and
outputting a notification to a user in response to the at least one of the physical orientation or angle of approach of the tool and the extension connected to the working output of the tool varying from the expected at least one of the physical orientation or angle of approach of the tool and the extension connected to the working output of the tool.

18. The method of claim 10, wherein the required tool output comprises a required socket shape, required socket size, or both.

* * * * *